(12) United States Patent
Seri et al.

(10) Patent No.: US 10,018,783 B2
(45) Date of Patent: Jul. 10, 2018

(54) FAN-OUT JOINT FOR FIBEROPTIC CABLES

(71) Applicant: Mellanox Technologies, Ltd., Yokneam (IL)

(72) Inventors: Hen Seri, Poriya (IL); Andrey Ger, Ramat Gan (IL); Samer Yasin, Araba (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 15/368,721

(22) Filed: Dec. 5, 2016

(65) Prior Publication Data

US 2018/0156975 A1    Jun. 7, 2018

(51) Int. Cl.
*G02B 6/255* (2006.01)
*G02B 6/44* (2006.01)

(52) U.S. Cl.
CPC ......... *G02B 6/2558* (2013.01); *G02B 6/4472* (2013.01)

(58) Field of Classification Search
None
See application file for complete search history.

(56) References Cited

U.S. PATENT DOCUMENTS

| 4,585,304 | A | * | 4/1986 | Winter | B29C 45/14549 |
| | | | | | 385/72 |
| 4,930,859 | A | * | 6/1990 | Hoffman, III | G02B 6/3803 |
| | | | | | 385/97 |
| 8,737,786 | B1 | | 5/2014 | Compton et al. | |
| 2005/0265672 | A1 | | 12/2005 | Theuerkorn et al. | |
| 2008/0181563 | A1 | * | 7/2008 | Akiyama | G02B 6/2555 |
| | | | | | 385/96 |
| 2011/0262084 | A1 | | 10/2011 | Ott et al. | |
| 2013/0146355 | A1 | * | 6/2013 | Strasser | G02B 6/4471 |
| | | | | | 174/72 A |
| 2016/0020573 | A1 | * | 1/2016 | Watanabe | G02B 6/2856 |
| | | | | | 359/341.3 |
| 2016/0049782 | A1 | | 2/2016 | Strasser et al. | |
| 2016/0202438 | A1 | * | 7/2016 | Bustamante | G02B 6/4477 |
| | | | | | 385/137 |

FOREIGN PATENT DOCUMENTS

JP    05157929 A  *  6/1993

OTHER PUBLICATIONS

European Application # 17205563.4 search report dated Apr. 5, 2018.

* cited by examiner

*Primary Examiner* — Sung Pak
(74) *Attorney, Agent, or Firm* — D.Kligler IP Services Ltd.

(57) ABSTRACT

A method for producing a fiberoptic fan-out includes creating a splice joint between a first fiberoptic cable and two or more second fiberoptic cables, such that at the splice joint, each of a plurality of first optical fibers in the first fiberoptic cable is spliced to a respective second optical fiber in one of the second fiberoptic cables. A tube slides over the cables to a position at which the splice joint is contained inside the tube. While the splice joint is contained inside the tube, the tube is filled with a fixative so as to fix the splice joint in the position.

13 Claims, 3 Drawing Sheets

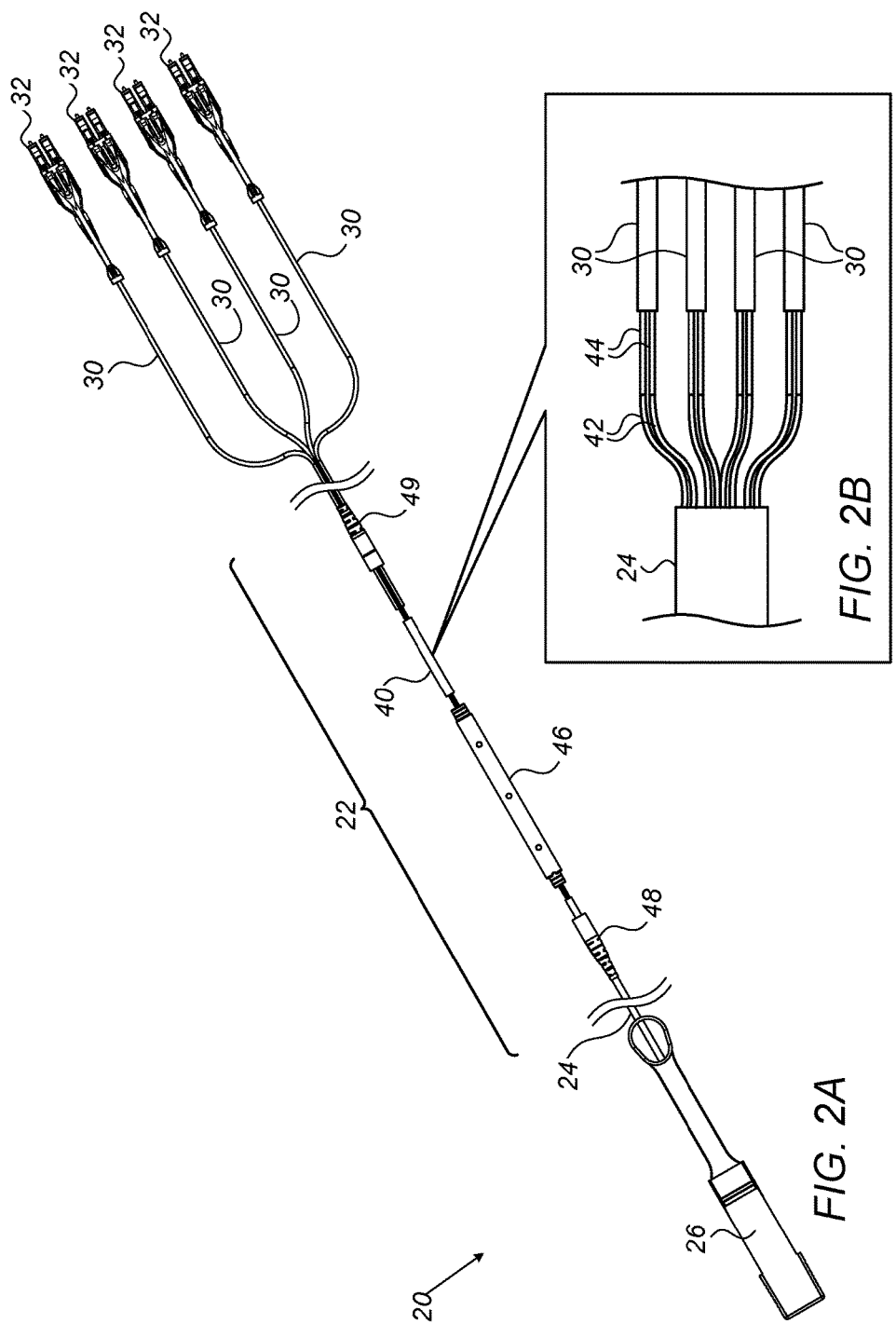

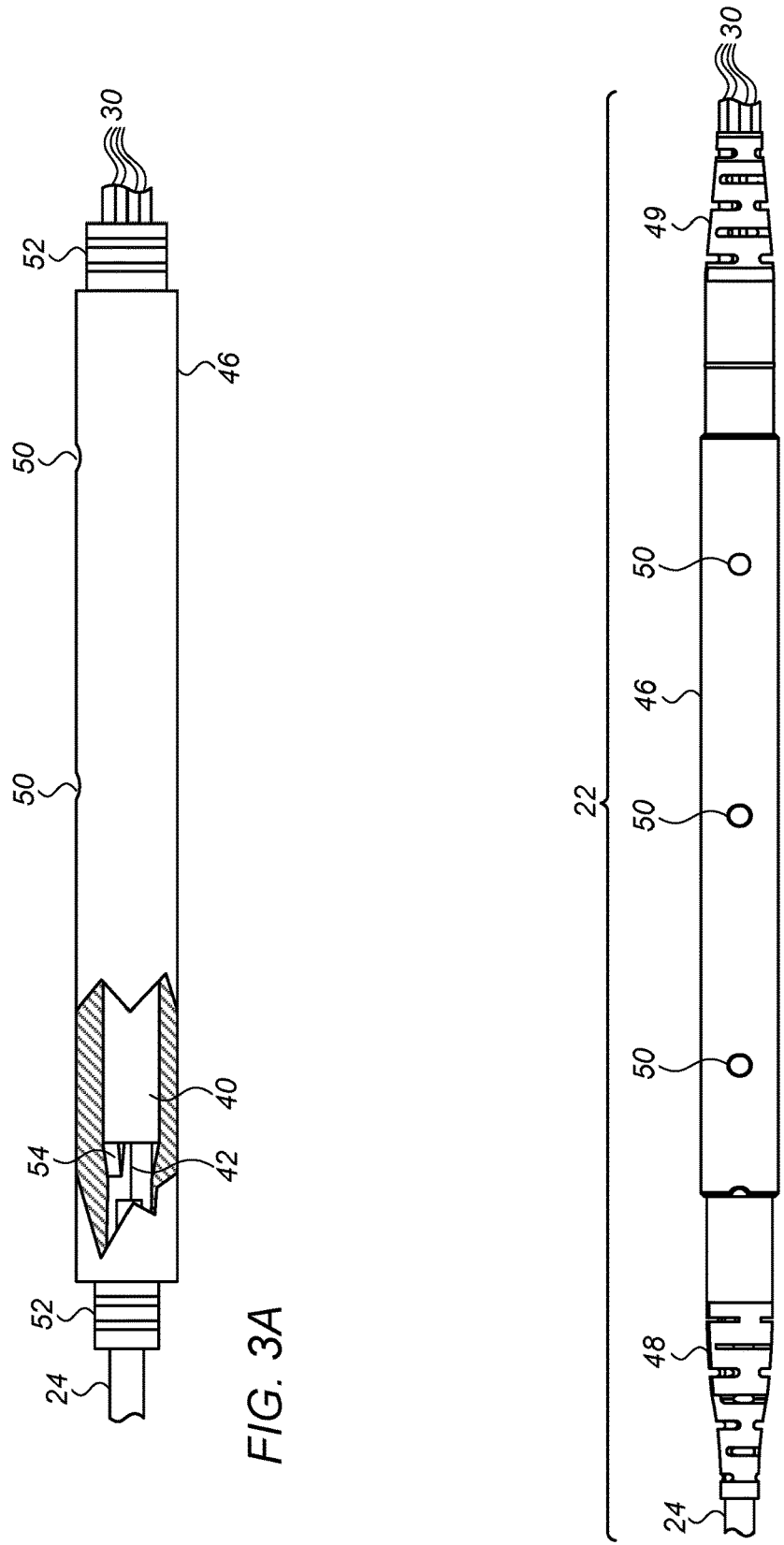

FAN-OUT JOINT FOR FIBEROPTIC CABLES

FIELD OF THE INVENTION

The present invention relates generally to optical fiber communications, and particularly to fiberoptic cables and methods for their production.

BACKGROUND

Fiberoptic cables commonly contain multiple fibers bundled together in an outer protective jacket. At the ends of the cable, all of the fibers may be connected to respective pins of a single optical connector, but in some cases, the fibers in the cable are fanned out into multiple, separate terminations, each with its own connector. Typically, after fanning out the fibers from the main cable, the fibers that are to be attached to each connector are fed through a separate protective jacket of their own. This process generally limits the fan-out point to locations near the end of the cable.

SUMMARY

Embodiments of the present invention that are described hereinbelow provide improved methods for production of fiberoptic cables, as well as cables produced by such methods.

There is therefore provided, in accordance with an embodiment of the invention, a method for producing a fiberoptic fan-out, which includes creating a splice joint between a first fiberoptic cable and two or more second fiberoptic cables, such that at the splice joint, each of a plurality of first optical fibers in the first fiberoptic cable is spliced to a respective second optical fiber in one of the second fiberoptic cables. A tube slides over the cables to a position at which the splice joint is contained inside the tube. While the splice joint is contained inside the tube, the tube is filled with a fixative so as to fix the splice joint in the position.

In a disclosed embodiment, the first and second fiberoptic cables have respective first and second ends, wherein the first ends of the first and second fiberoptic cables are joined together at the splice joint, and the method includes terminating the second end of the first fiberoptic cable with a first connector of a first type, and terminating the second ends of the second fiberoptic cables with second connectors of a second type, different from the first type.

In some embodiments, creating the splice joint includes fitting a tubular splice protector over the splice joint, and sliding the tube includes fitting the tube over the tubular splice protector. In a disclosed embodiment, the tube contains an internal shoulder, and fitting the tube includes sliding the tubular splice protector into the tube until an end of the tubular splice protector engages the internal shoulder.

Additionally or alternatively, the tube includes an outer wall enclosing an inner lumen into which the splice joint is inserted and having one or more holes formed transversely through the outer wall into the inner lumen, and filling the tube includes injecting the fixative through the one or more holes. In a disclosed embodiment, the fixative includes an epoxy, which is injected through the one or more holes in a fluid form and hardens inside the tube.

Further additionally or alternatively, the tube has first and second ends, through which the first and second cables respectively protrude after positioning the splice joint inside the tube, and the method includes attaching first and second strain-relief boots, fitting over the first and second cables, respectively, to the first and second ends of the tube.

In one embodiment, the two or more second fiberoptic cables include four second fiberoptic cables, which are joined to the first fiberoptic cable at the splice joint.

There is also provided, in accordance with an embodiment of the invention, fiberoptic apparatus, including a first fiberoptic cable, including a plurality of first optical fibers, and two or more second fiberoptic cables, including second optical fibers. Each of the first optical fibers in the first fiberoptic cable is spliced at a splice joint to a respective second optical fiber in one of the second fiberoptic cables. A tube is fitted over the cables and containing the splice joint inside the tube, and a fixative fills the tube so as to fix the splice joint in position in the tube.

The present invention will be more fully understood from the following detailed description of the embodiments thereof, taken together with the drawings in which:

BRIEF DESCRIPTION OF THE DRAWINGS

FIG. 2A is a schematic, exploded view of the components of a fan-out assembly incorporated in a fiberoptic cable, in accordance with an embodiment of the invention;

FIG. 2B is a schematic detail view of a splice joint in the fan-out assembly of FIG. 2A;

FIG. 3A is a schematic side view, with a partial cutaway, of a fan-out tube used in a fiberoptic cable, in accordance with an embodiment of the invention; and FIG. 3B is a schematic side view of a fan-out assembly incorporating the fan-out tube of FIG. 3A, in accordance with an embodiment of the invention.

DETAILED DESCRIPTION OF EMBODIMENTS

Figure 1:
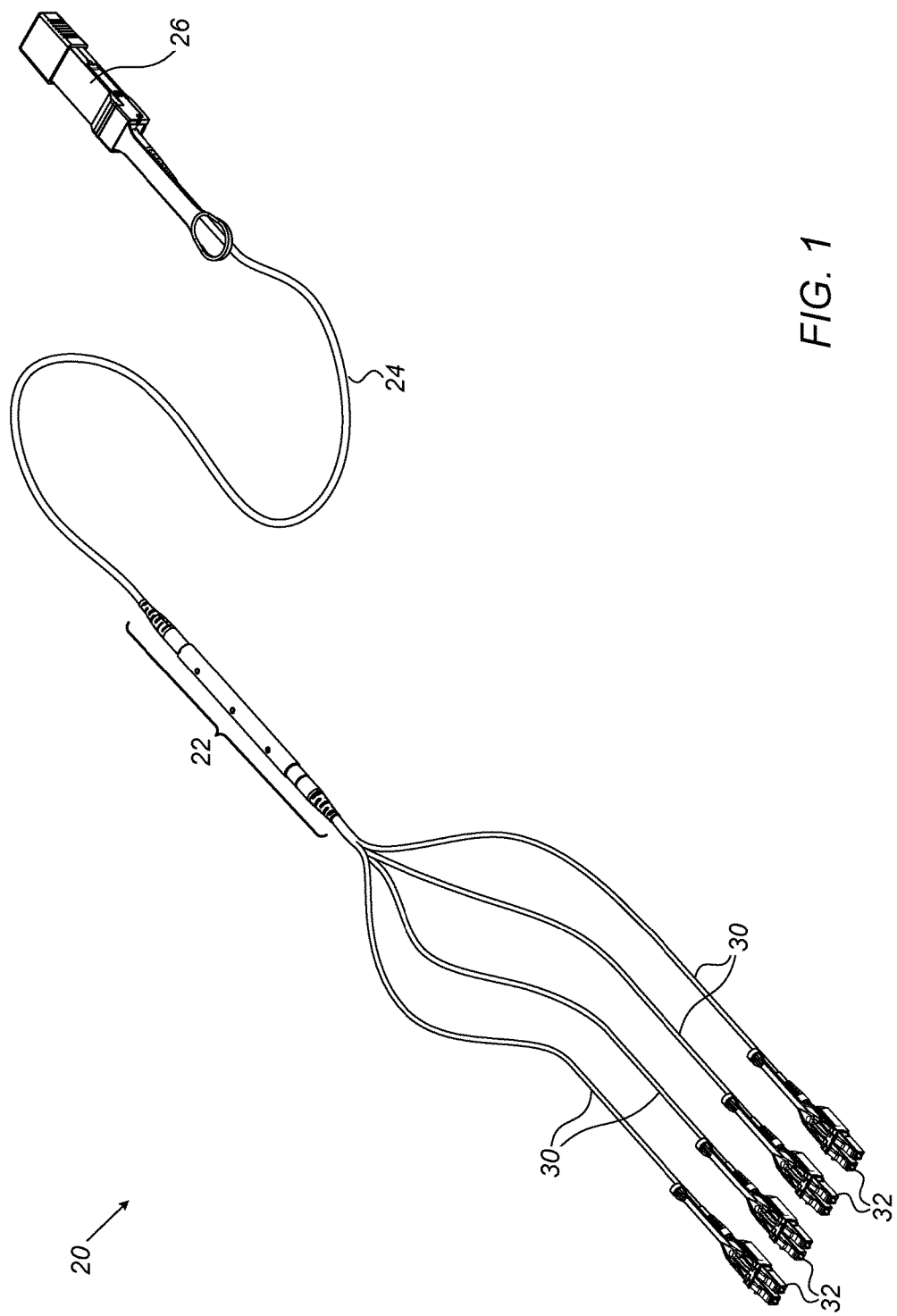
FIG. 1 is a schematic pictorial illustration of a fiberoptic cable, in accordance with an embodiment of the invention.

Embodiments of the present invention that are described herein provide novel methods for fabrication of fan-out cables, as well as cables produced by such methods. These methods make it practical to create a reliable fan-out joint anywhere along the length of a cable, without limitation to locations near the ends of the cable as in methods that are known in the art. A cable of this sort can thus be connected, for example, to a single, multi-pin communication socket at one end, while fanning out at the other end to connect to multiple smaller sockets in different locations, which may be spaced several meters apart.

In the disclosed methods, a splice joint is created between a multi-fiber fiberoptic cable and two or more smaller fiberoptic cables. At the splice joint, each of the optical fibers in the multi-fiber fiberoptic cable is spliced to a respective optical fiber in one of the smaller fiberoptic cables. A special-purpose tube, referred to in the description that follows as a "fan-out tube," is slid over the cables to a position at which the splice joint is contained inside the tube. With the splice joint in position inside the tube, the tube is filled with a fixative, such as a suitable epoxy, which fixes the splice joint in position.

FIG. 1 is a schematic pictorial illustration of a fiberoptic cable 20 of this sort with a fan-out assembly 22, in accordance with an embodiment of the invention. In this example, cable 20 comprises an eight-fiber cable 24, which terminates in a multi-pin connector 26 at one end (such as an SFP-type connector). The ends of the optical fibers in cable 24 are spliced within fan-out assembly 22 to the ends of corresponding fibers in four two-fiber cables 30, which terminate in respective passive optical connectors 32. Cables 30 may be contained together in a protective jacket over a part of their lengths, but the use and extent of such a jacket are optional.

More generally speaking, certain particular types and numbers of cables and their respective terminations are shown in FIG. 1 only by way of example; and the components and techniques that are described herein may be applied, mutatis mutandis, in creating fan-outs between substantially any suitable types of fiberoptic cables with any numbers of optical fibers.

Reference is now made to FIGS. 2A and 2B, which schematically show details of fan-out assembly 22, in accordance with an embodiment of the invention. FIG. 2A is an exploded view of the components of the fan-out assembly, while FIG. 2B shows details of a splice joint in assembly 22.

At the splice joint, each optical fiber 42 in cable 24 is connected to a corresponding fiber 44 in one of cables 30. These splice connections can be made using techniques that are well known in the art, such as fusion splicing, with tools that are commercially available from various vendors. After fibers 42 and 44 have been spliced together, a tubular splice protector 40 is slid over the splice joint. Splice protector 40 typically comprises a plastic tube with a stiffening member to avoid excessive bending of the spliced fibers. For example, splice protector 40 may comprise an inner tube made from a meltable adhesive, such as ethylene vinyl acetate (EVA), which is contained, together with a stainless steel stiffening wire, inside an outer tube made from a heat-shrinkable plastic, such as polyolefin. After this splice protector is slid over the splice joint, it is heated to activate the inner tube adhesive and shrink the outer tube to fit tightly over the splice and stiffening wire. Splice protectors of this sort are available from various vendors, and the details of their design are beyond the scope of the present disclosure.

After fitting splice protector 40 over the splice joint, a fan-out tube 46 is slid over cables 24 and 30 to a position at which splice protector 40 is contained inside tube 46. In the present embodiment, a shoulder 54 inside tube 46 (shown in FIG. 3A) ensures that splice protector 40 stops at precisely the correct location within tube 46 and does not inadvertently pass through to the other side. Fan-out tube 46 is then filled with a fixative, such as a suitable epoxy, to fix splice protector 40 permanently in place and fix all of the cables together to the fan-out tube. Strain relief boots 48 and 49 are fitted over cables 24 and 30 (which protrude respectively from the two ends of fan-out tube 46) to the ends of the fan-out tube. (Boot 49 in the present example has a larger inner diameter than boot 48, since boot 48 accommodates only the single cable 24, while boot 49 accommodates all four of cables 30.) Boots 48 and 49 prevent possible damage to the optical fibers that could otherwise result due to unintended bending of cables 24 and 30 against the ends of the fan-out tube.

FIG. 3A is a schematic side view, with a partial cutaway, of fan-out tube 46 with splice protector 40 fitted inside, in accordance with an embodiment of the invention. The inner lumen of fan-out tube 46 is designed to snugly contain splice protector 40. As noted earlier, tube 46 contains internal shoulder 54, with a smaller diameter than splice protector 40. After splicing fibers 42 and 44 and then fitting splice protector 40 over the splice joint, the splice protector is slid into fan-out tube 46 (from the right side in the view shown in FIG. 3A) until the end of the splice protector engages shoulder 54. This shoulder thus ensures that the splice joint will be properly positioned inside tube 46.

FIG. 3B is a schematic side view of fan-out assembly (with fan-out tube 46 rotated by 90° relative to the view shown in FIG. 3A), in accordance with an embodiment of the invention. Fan-out tube 46 has a number of holes 50 that are formed transversely through the outer wall of the tube to the inner lumen where splice protector 40 is contained. A fixative, such as an epoxy, is injected through holes 50 in fluid form and hardens inside, thus fixing splice protector 40 and cables 24 and 30 in place. The fixative is typically injected through a nozzle or nozzles (not shown) that fit tightly into holes 50, so that the fixative spreads evenly through the inner lumen without leaking out. Optionally, fan-out tube 46 may be heated after injection of the fixative for the purpose of thermal curing.

Strain-relief boots 48 and 49 are fitted over external shoulders 52 at the ends of tube 46 (FIG. 3A), either before or after fixation of splice protector 40 inside the tube.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for producing a fiberoptic fan-out, comprising:
    creating a splice joint between a first fiberoptic cable and two or more second fiberoptic cables, such that at the splice joint, each of a plurality of first optical fibers in the first fiberoptic cable is spliced to a respective second optical fiber in one of the second fiberoptic cables, wherein creating the splice joint comprises fitting a tubular splice protector over the splice joint;
    sliding a tube over the tubular splice protector to a position at which the splice joint is contained inside the tube; and
    while the splice joint is contained inside the tube, filling the tube with a fixative so as to fix the splice joint in the position,
    wherein the tube contains an internal shoulder, and wherein fitting the tube comprises sliding the tubular splice protector into the tube until an end of the tubular splice protector engages the internal shoulder.

2. The method according to claim 1, wherein the first and second fiberoptic cables have respective first and second ends, wherein the first ends of the first and second fiberoptic cables are joined together at the splice joint, and
    wherein the method comprises terminating the second end of the first fiberoptic cable with a first connector of a first type, and terminating the second ends of the second fiberoptic cables with second connectors of a second type, different from the first type.

3. The method according to claim 1, wherein the tube comprises an outer wall enclosing an inner lumen into which the tubular splice protector is inserted and having one or more holes formed transversely through the outer wall into the inner lumen, and wherein filling the tube comprises injecting the fixative through the one or more holes.

4. The method according to claim 3, wherein the fixative comprises an epoxy, which is injected through the one or more holes in a fluid form and hardens inside the tube.

5. The method according to claim 1, wherein the tube has first and second ends, through which the first and second cables respectively protrude after positioning the splice joint inside the tube, and wherein the method comprises attaching first and second strain-relief boots, fitting over the first and second cables, respectively, to the first and second ends of the tube.

6. The method according to claim 1, wherein the two or more second fiberoptic cables comprise four second fiberoptic cables, which are joined to the first fiberoptic cable at the splice joint.

7. Fiberoptic apparatus, comprising:
a first fiberoptic cable, comprising a plurality of first optical fibers;
two or more second fiberoptic cables, comprising second optical fibers;
a splice joint, at which each of the first optical fibers in the first fiberoptic cable is spliced to a respective second optical fiber in one of the second fiberoptic cables;
a tubular splice protector, which fits over the first and second optical fibers, at the splice joint;
a tube fitted over the cables and containing the splice protector inside the tube, wherein the tube comprises an internal shoulder, which engages an end of the tubular splice protector inside the tube; and
a fixative filling the tube so as to fix the splice joint in position in the tube.

8. The apparatus according to claim 7, wherein the first and second fiberoptic cables have respective first and second ends, wherein the first ends of the first and second fiberoptic cables are joined together at the splice joint, and
wherein the apparatus comprises a first connector of a first type terminating the second end of the first fiberoptic cable, and second connectors of a second type, different from the first type, terminating the second ends of the second fiberoptic cables.

9. The apparatus according to claim 7, wherein the tube comprises an outer wall enclosing an inner lumen into which the tubular splice protector is inserted and having one or more holes formed transversely through the outer wall into the inner lumen, wherein the fixative is injected into the tube through the one or more holes.

10. The apparatus according to claim 9, wherein the fixative comprises an epoxy, which is injected through the one or more holes in a fluid form and hardens inside the tube.

11. The apparatus according to claim 7, wherein the tube has first and second ends, through which the first and second cables respectively protrude after positioning the splice joint inside the tube, and wherein the apparatus comprises first and second strain-relief boots, fitting over the first and second cables, respectively, and attached to the first and second ends of the tube.

12. The apparatus according to claim 7, wherein the two or more second fiberoptic cables comprise four second fiberoptic cables, which are joined to the first fiberoptic cable at the splice joint.

13. The method according to claim 1, wherein fitting the tubular splice protector over the splice joint comprises heating the tubular splice protector after it is fitted over the splice joint, so that an inner tube adhesive of the tubular splice protector is activated.

* * * * *